UNITED STATES PATENT OFFICE.

PHILIP DREESBACH, OF NEW YORK, N. Y., ASSIGNOR TO CORN PRODUCTS REFINING COMPANY, OF NEW YORK, N. Y., A CORPORATION OF NEW JERSEY.

MATERIAL FOR USE IN BREWING AND THE LIKE.

1,186,894.  Specification of Letters Patent.  Patented June 13, 1916.

No Drawing.   Application filed April 30, 1915.   Serial No. 25,061.

*To all whom it may concern:*

Be it known that I, PHILIP DREESBACH, a citizen of the United States, residing at New York, borough of Manhattan, in the county of New York and State of New York, have invented certain new and useful Improvements in Materials for Use in Brewing and the like, of which the following is a specification.

This invention relates to a novel material for use in the art of brewing and similar industries.

In the art of brewing and other fermentation industries there are two principal starchy materials used as an adjunct to malt. These are corn grits and meal and rice grits and meal. Both of these materials are mainly composed of the desirable constituent which is starch, but this is held together by cellulose as a binding material, which agglutinates the starchy granules, and there is also present albumin and oil both of which are undesirable. The oil and albumin cannot be removed by what is known in the dry milling process of degermination and decortication. For many years an effort has been made in the practice of the art to eliminate the albumin and oil present in these two materials, but the best which has been accomplished has been to reduce the oil content to a minimum of from about one half to one and one half per cent., and the albumin content to a minimum of about six per cent.

The purpose of my invention is to produce a new material which possesses the desirable constituents and qualities of the two materials mentioned but is substantially free from their undesirable constituents and qualities. To that end, I have produced a material which is substantially pure starch with a binding material other than cellulose and practically free from oil or albumin and in such physical form that it does not create dust when handled customarily as required by the art.

In the production of this new material, I take starch powder in any convenient quantity, or the starch in a moist condition before it is converted into a powder, and add to it a suitable binding material. When the starch is to be used in brewing, I prefer to use as the binding material, either liquid commercial glucose, cane sugar or dextrin. The glucose being the cheapest, is the most suitable in ordinary cases. It will be understood of course that I may use in place of the three materials mentioned, any equivalent mucilaginous, albuminous, gelatinous, dextrinous, dextrose or sucrose material.

In practice, when I use glucose I make a solution by diluting the commercial liquid to about one half its usual density with water, or I use the glucose liquor before concentration to its usual commercial density. If I use cane sugar or dextrin, I make a solution in water in the proportion of about five to ten pounds of dextrin or sugar to about ninety to ninety five pounds of the solid starch to be treated and I add sufficient water to make a fairly thick paste. This solution is added to the starch in any suitable manner. The excess of moisture after the materials have been thoroughly mixed is preferably removed by subjecting them to the action of heat in a suitable apparatus until they are formed into a cake or block and this cake or block is then broken up in fragments of such a size that they can be graded by sifting through sieves of a proper mesh. In the brewing industry, these fragments must be of such a size that they will not raise a dust in handling. That is, that they will not form dust appreciably in an ordinary jute or cotton bag during ordinary handling, such as being unloaded from a freight car to a truck or hauled over a rough pavement or being dropped from a truck to the sidewalk a distance of from three to four feet. Or that they will not form dust when they are elevated in the usual bucket elevator or conveyer or transported horizontally in the usual screw conveyer where the casings for the moving parts are not hermetically sealed, as for instance, when they are composed of wood.

It is obvious that by this process I have produced a material which has a suitable binder, just as the original material had in nature, but which binder is of a more desirable kind and that the material which I have produced is practically free from oil and albumin which these materials in their natural state are not.

I claim:

1. A substantially dust free starch product in the form of fragments composed of starch and a soluble binder which holds the starch granules together.

2. A starch product in the form of fragments composed of starch and a substance derived from starch by conversion which acts as a binder to hold the starch granules together.

3. A substantially dust free starch product in the form of fragments composed of starch substantially ungelatinized, and a binder for holding the starch granules together.

4. A substantially dust free starch product in the form of fragments composed of starch substantially ungelatinized, and a soluble binder for holding the starch granules together.

5. A starch product in the form of fragments composed of starch substantially ungelatinized, and a binder consisting of a substance derived from starch by conversion for holding the starch granules together.

6. A substantially dust free starch product composed of starch and a binder in the form of compact relatively hard bodies which break down in water at usual mashing temperatures to form starch milk leaving no residue.

7. A substantially dust free starch product composed of starch and a substance derived from starch by conversion in the form of compact relatively hard bodies which break down in water at usual mashing temperatures to form starch milk leaving no residue.

In testimony whereof I affix my signature in presence of a witness.

PHILIP DREESBACH.

Witness:
ALDA L. MILLER.